United States Patent
Spracklen et al.

(10) Patent No.: US 9,081,536 B2
(45) Date of Patent: Jul. 14, 2015

(54) PERFORMANCE ENHANCEMENT IN VIRTUAL DESKTOP INFRASTRUCTURE (VDI)

(71) Applicant: VMware, Inc., Palo Alto, CA (US)

(72) Inventors: Lawrence Spracklen, Boulder Creek, CA (US); Banit Agrawal, Sunnyvale, CA (US); Rishi Bidarkar, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/513,167

(22) Filed: Oct. 13, 2014

(65) Prior Publication Data

US 2015/0035724 A1 Feb. 5, 2015

Related U.S. Application Data

(63) Continuation of application No. 13/663,175, filed on Oct. 29, 2012, now Pat. No. 8,862,695.

(51) Int. Cl.
*H04L 12/26* (2006.01)
*G06F 3/14* (2006.01)
*H04N 19/89* (2014.01)
*G06F 9/44* (2006.01)
*H04N 19/895* (2014.01)

(52) U.S. Cl.
CPC ............ *G06F 3/1462* (2013.01); *G06F 3/1415* (2013.01); *G06F 3/1454* (2013.01); *G06F 9/4445* (2013.01); *H04L 43/0829* (2013.01); *H04N 19/00939* (2013.01); *H04N 19/895* (2014.11)

(58) Field of Classification Search
CPC .................................................. H04L 43/0829
See application file for complete search history.

(56) References Cited

U.S. PATENT DOCUMENTS

| | | | |
|---|---|---|---|
| 7,626,587 B1* | 12/2009 | de Waal et al. | 345/536 |
| 2006/0230156 A1* | 10/2006 | Shappir et al. | 709/227 |
| 2009/0222462 A1* | 9/2009 | Alpern et al. | 707/100 |
| 2010/0161711 A1* | 6/2010 | Makhija et al. | 709/203 |
| 2010/0211663 A1* | 8/2010 | Barboy et al. | 709/223 |
| 2010/0306413 A1* | 12/2010 | Kamay | 709/247 |
| 2011/0154172 A1* | 6/2011 | Lee et al. | 714/819 |
| 2011/0179106 A1* | 7/2011 | Hulse et al. | 709/203 |
| 2012/0096461 A1* | 4/2012 | Goswami et al. | 718/1 |
| 2012/0304168 A1* | 11/2012 | Raj Seeniraj et al. | 718/1 |
| 2012/0324358 A1* | 12/2012 | Jooste | 715/733 |
| 2013/0132971 A1* | 5/2013 | Assuncao et al. | 718/105 |
| 2013/0141642 A1* | 6/2013 | Wu et al. | 348/441 |

* cited by examiner

*Primary Examiner* — Lashonda Jacobs

(57) ABSTRACT

In one embodiment, a method displays images from a remote desktop of a desktop GUI on a client device. The method receives a plurality of image blocks for a frame update of an image of the desktop GUI being displayed on the client device. The remote desktop is being run on a host. The client device determines that one or more missing image blocks have not been received for the frame update and determines if the frame update should be performed without the one or more missing image blocks. If the frame update of the desktop GUI should be performed without the one or more missing image blocks, the client device performs the frame update of the desktop GUI using the plurality of image blocks without using the one or more missing image blocks.

20 Claims, 7 Drawing Sheets

PERFORMANCE ENHANCEMENT IN VIRTUAL DESKTOP INFRASTRUCTURE (VDI)

CLAIM OF PRIORITY

This application is a continuation of U.S. patent application Ser. No. 13/663,175 filed on Oct. 29, 2012, now U.S. Pat. No. 8,886,695, the content of which is incorporated by reference herein its entirety.

BACKGROUND

Virtual desktop infrastructure (VDI) refers to a system that uses remote desktop protocols (hereinafter referred to as "remoting protocols") that allow a user's client device to connect to a remote desktop. The term, "remote desktop" refers to an instance of a user computer system or virtual machine that runs remotely to the user, e.g., in a remote datacenter. The term, "remote desktop" may also be used to refer to the user interface presented to a user The remote desktop is running on a host, which receives commands from the client device and updates an image of a display of the remote desktop to the client device (referred to as "display remoting") based on the commands. Updates of the image of the remote desktop on the user's client device should be in real-time based on the input received from the client device and the activity of the operating system and the applications running on the remote desktop.

Due to the real-time nature of display remoting, remoting protocols need to deliver a good user experience even in the presence of hostile network environments. When the remote desktop and the client device are connected by a high-speed local area network (LAN) where an abundance of bandwidth is available, low round-trip latencies exist with close to zero packet loss. In this environment, the remoting protocols deliver a high-quality user experience. However, users may not always connect in an ideal environment. For example, users are more frequently connecting to remote desktops over high latency, high loss wide area networks (WANs) via mobile and/or distributed environments. In one example, users may connect from remote branch offices to remote desktops housed in a central data center or cloud, or users may connect via wireless networks (e.g., WiFi), that are often public networks, which may be congested. These environments result in network conditions that include high rates of packet loss and high latency, which may not be conducive to delivering a high-quality user experience.

Prior generation remoting protocols used Transmission Control Protocol (TCP) to handle transport of image blocks to update an image of the desktop graphical user interface (GUI) on the client device. TCP is a reliable protocol that handled the reliable transport of the image blocks to the client device. However, more recent remoting protocols use other network protocols, such as User Datagram Protocol (UDP), that are not reliable. In this case, the remoting protocol is responsible to ensure reliable transport of the image blocks.

In one example, a series of packets may carry image blocks for an update of an image of the desktop GUI generated by the remote desktop. In the course of sending the packets from the host to the client device, some packets may be lost resulting in the client device not having complete set of image blocks for the update. Even though remoting protocols leverage UDP, the remoting protocols typically re-transmit each and every lost data packet. As a result, when packet loss occurs, the remoting protocol prevents the client device from rendering an update to the image of the desktop GUI until resolving the lost packet problem. For example, the client device typically waits some period to determine if the packet is delayed, determines the packet is lost, notifies the remote desktop of the lost packet, and then waits for the remote desktop to resend the lost packet.

In low latency networks, the remote desktop can send lost packets promptly, and the user experience is most likely not adversely affected. However, in high latency networks, the time taken to resolve the lost packet problem may affect the user experience as the client device delays the update until the problem is resolved. This impacts the maximum rate that the client device can deliver to update images of the desktop GUI, which impacts user experience, such as causing video rendering, scroll operations, window drag operations to look slow and jumpy.

SUMMARY

In one embodiment, a method displays images from a remote desktop of a desktop GUI on a client device. The method receives a plurality of image blocks for a frame update of an image of the desktop GUI being displayed on the client device. The remote desktop is being run on a host. The client device determines that one or more missing image blocks have not been received for the frame update and determines if the frame update should be performed without the one or more missing image blocks. If the frame update of the desktop GUI at the client should be performed without the one or more missing image blocks, the client device performs the frame update of the desktop GUI using the plurality of image blocks without using the one or more missing image blocks.

In one embodiment, a host determines a plurality of image blocks for the frame update of an image of the desktop GUI being displayed on the client device. The host compresses the plurality of image blocks into a compressed stream where the compressed plurality of image blocks in the compressed stream are of a variable length. Portions of the compressed stream are included in a plurality of packets. The host also determines a plurality of markers indicating positional information for compressed image blocks in the compressed stream and sends the plurality of packets and the plurality of markers to the client device. The client device uses the plurality of markers to resynchronize compressed image blocks in the compressed stream with a position in the frame update when packet loss occurs.

The following detailed description and accompanying drawings provide a better understanding of the nature and advantages of particular embodiments.

DETAILED DESCRIPTION

In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Figure 1:
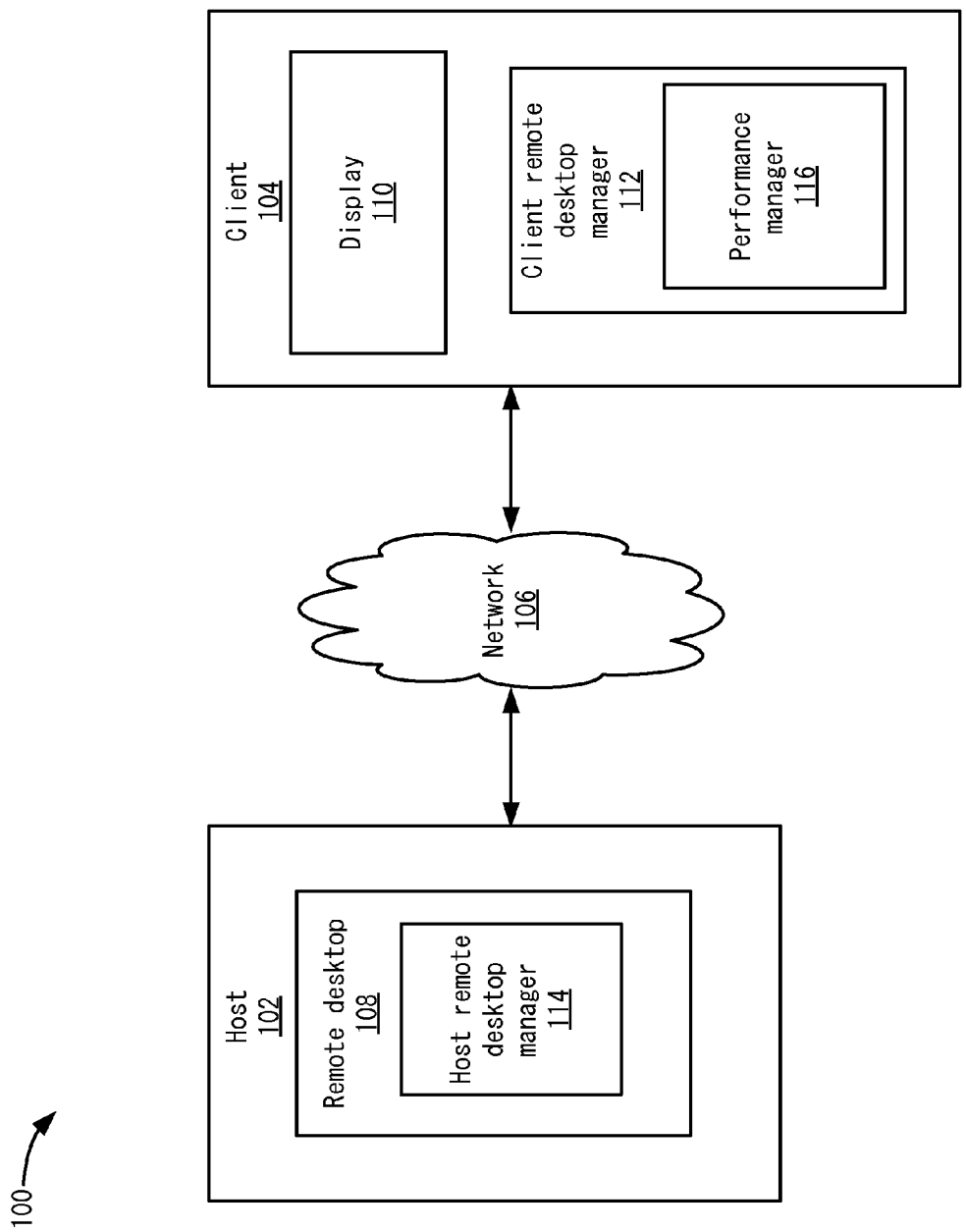
FIG. 1 depicts a simplified system of a remote desktop environment for processing lost packets according to one embodiment.

FIG. 1 depicts a simplified system 100 of a remote desktop environment for processing lost packets according to one embodiment. System 100 includes a host 102 and a client device 104 that communicate through a network 106. Host 102 and client device 104 use a remoting protocol to display an image at client device 104 of a desktop GUI (not shown) that is provided the remote desktop running on host 102. Although particular embodiments are described with respect to a Virtual Desktop Infrastructure (VDI), particular embodiments may be used in other environments, such as systems that update information on remote computers. For example, client device 104 updates frames of the image on a display 110. Each consecutive image may be referred to as a "frame" and a frame update is the display of a new image. It should be noted that each frame may be regarded being composed of multiple independent sub-components to allow parallel encode/decode and improve encoding efficiencies. Loss in any particular sub-component would impact large portions of the image of the desktop GUI. Accordingly, the term frame may mean both frame and sub-component/sub-frame constructs.

In one embodiment, remote desktop 108 may be executing applications in a virtualized environment, such as in a virtual machine (VM) (not shown) running on host 102. A person of skill in the art would appreciate how to implement remote desktop 108 in the virtualized environment. However, although a virtualized environment is described, remote desktop 108 may be running in a non-virtualized environment. For example, other environments where a remote application running on a computer system transmits image data for frame updates to client device 104 may be used.

The running of remote desktop 108 on host 102 and the display of an image of the desktop GUI on client device 104 may be referred to display remoting. In display remoting, client remote desktop manager 112 sends input/output (I/O) commands from peripheral devices associated with client device 104 to remote desktop 108. A host remote desktop manager 114 processes the input/output commands and sends image blocks for a frame update to client remote desktop manager 112. Client remote desktop manager 112 then updates an image of the desktop GUI on display 110 using the image blocks. For example, a user may use a mouse to drag a window on the desktop GUI. Client remote desktop manager 112 detects the movement and sends an I/O command for the movement. Host remote desktop manager 114 processes the I/O command causing the window to move across an image of the desktop GUI. Host remote desktop manager 114 then sends frame updates to client remote desktop manager 112, which updates the image of the desktop GUI being displayed on display 110 to show the movement. In some examples, the entire desktop image is not updated in response to the window drag; rather, the remoting protocol determines which sub-regions of the desktop image has changed as a result of this operation and only updates these changed regions.

In one embodiment, host remote desktop manager 114 sends a frame update in multiple packets. Each packet may include a set of image blocks where each image block may correspond to a portion of the frame update to be displayed on display 110. If all of the packets are received, client remote desktop manager 112 uses the image blocks to perform a frame update of the image of the desktop GUI on display 110.

In some cases, client remote desktop manager 112 may not receive all of the packets for the frame update, which results in missing image blocks needed to construct the frame. Even though packet loss has been encountered, particular embodiments allow client remote desktop manager 112 to intelligently determine whether or not to perform the frame update even though image blocks may be missing for the frame. For example, the remoting protocol allows client device 104 to tolerate packet loss without the requirement for retransmission of lost packets, which allows client device 104 to perform the frame update with missing image blocks. As will be described in more detail below, when a performance manager 116 of client remote desktop manager 112 determines that some packets have been lost for a frame update, performance manager 116 may indicate to client remote desktop manager 112 that the image should be updated using the received image blocks without requesting retransmission of the lost packets. This allows client device 104 to display the frame update without delay. Performance manager 116 may balance different criteria to provide a good user experience when determining whether to perform a frame update in light of packet loss. For example, although the frame update may include missing information, if the frame update corresponds to a sequence of a fleeting duration, such as high frequency screen updates, the missing image blocks will be replaced a fraction of a second later by a subsequent frame update. Thus, the user may not notice the missing image blocks in the frame update. Additionally, the user will not see any delay due to client remote desktop manager 112 waiting for retransmission of lost packets. Also, instead of ignoring the missing image blocks, client remote desktop manager 112 may extrapolate the missing image blocks in the frame update from received image blocks or may insert information (e.g., a black color) in the missing image blocks to reduce the noticeability of missing information, or may just leave the blocks unchanged from the prior frame.

Figure 2:
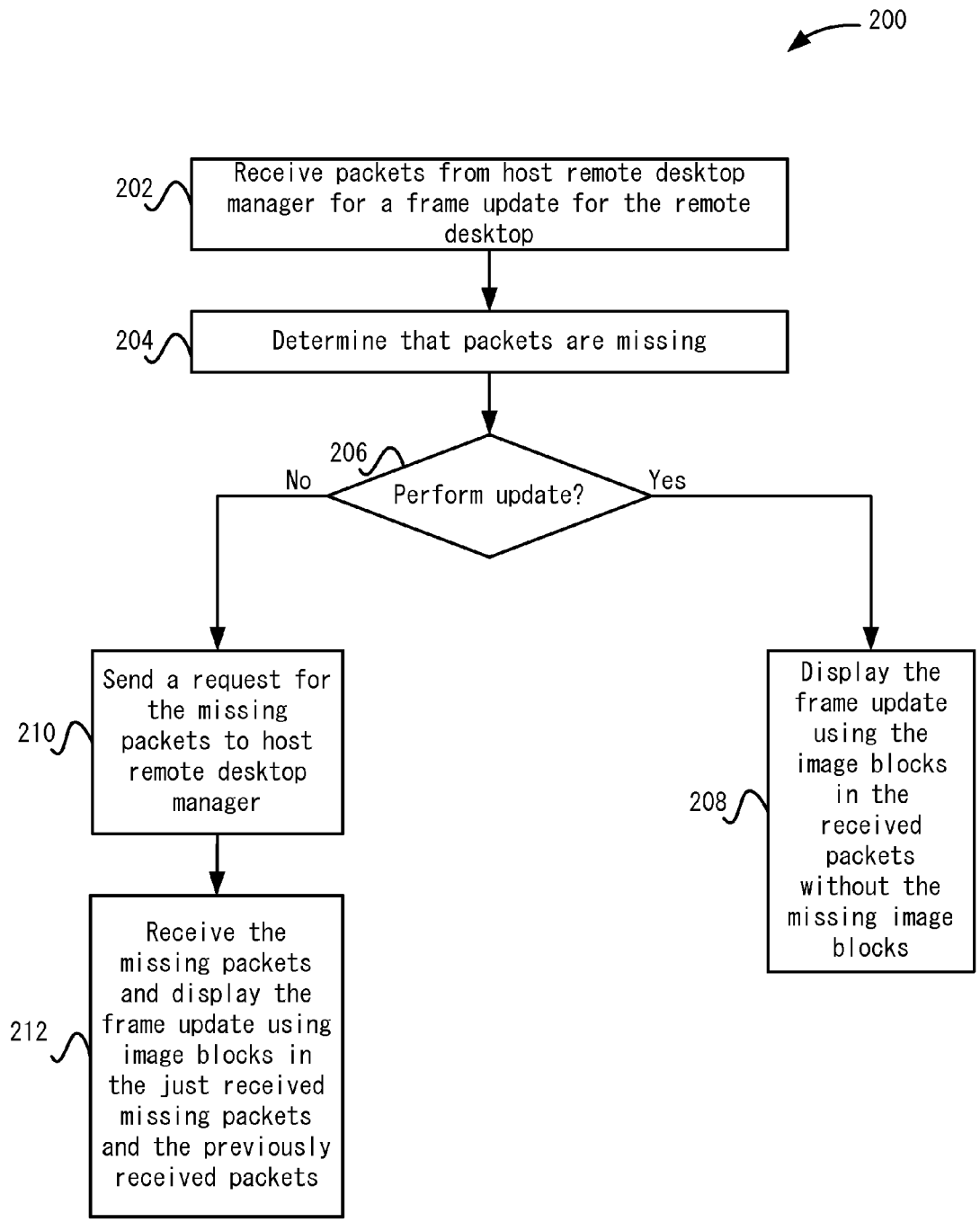
FIG. 2 depicts a simplified flowchart for performing a frame update according to one embodiment.

FIG. 2 depicts a simplified flowchart 200 for performing a frame update according to one embodiment. At 202, client remote desktop manager 112 receives packets from host remote desktop manager 114 for a frame update for the desktop GUI. Each packet may include a set of image blocks. At 204, performance manager 116 determines that packets are missing. For example, performance manager 116 may wait a certain time period to determine if the packets are delayed or lost. After the time period passes, performance manager 116 determines that the packets are lost. In one embodiment, packets sent from host remote desktop manager 114 include sequence numbers. For example, the network protocol, such as UDP, inserts sequence numbers in each packet to identify each packet in the sequence. Performance manager 116 can then determine if any packets have been lost based on the sequence numbers. For example, if packets 1, 2, 4, 5, 6, 7, 8, and 9 have been received, then after a certain time period, performance manager 116 may determine that packet #3 has been lost.

At 206, performance manager 116 determines if client remote desktop manager 112 should perform the frame update without the missing image blocks. For example, performance manager 116 determines if the missing image blocks from the missing packets cause image corruption over a threshold. To determine the image corruption, performance manager 116 may quantify the effects of the missing image blocks on the frame update. For example, performance manager 116 may limit the maximum number/percentage of missing image blocks in a frame update. If the image corruption (e.g., number of missing image blocks) is below a threshold, then performance manager 116 determines that the image is acceptable to display without the missing image blocks. Performance manager 116 may also consider other criteria, such as if the frame update is part of a high frequency frame updates. If the frame update should be performed, at 208, client remote desktop manager 112 displays the frame update using the image blocks in the received packets without the missing image blocks. If the missing image blocks in fact turn out to be merely delayed, client remote desktop manager 112 may optionally insert these image blocks into the updated frame. The decision whether to update the frame with any late arriving blocks may be based on a variety of factors, including the frame update frequency.

If performance manager 116 determines that the corruption (e.g., number of missing image blocks) is over a threshold, then performance manager 116 causes client remote desktop manager 112 to pause and not display the frame update while requesting the missing image blocks. At 210, client remote desktop manager 112 sends a request for the missing packets to host remote desktop manager 114. In this case, host remote desktop manager 114 can then resend the missing packets. At 212, client remote desktop manager 112 receives the missing packets and displays the frame update using image blocks in the just received missing packets and the previously received packets. As discussed above, a delay results due to the retransmission of the missing packets. However, client remote desktop manager 112 performs a frame update that does not include missing image blocks thus displaying a better image.

When client remote desktop manager 112 displayed the image without the missing image blocks, performance manager 116 may send a message informing host remote desktop manager 114 of the packet loss event. In the event of performance manager 116 requesting the missing packets as described at 210, host remote desktop manager 114 is already informed of the packet loss event. However, client remote desktop manager 112 may additionally send a message informing host remote desktop manager 114 of the packet loss event even if the retransmission has been requested. By informing remote desktop 108 of the packet loss event, host remote desktop manager 114 may take remedial action when applicable. For example, if the missing image blocks in consecutive updated frames have remained static across many updates (e.g., the missing image blocks are in the same location or sub-region), host remote desktop manager 114 may provide client remote desktop manager 112 with the missing image blocks to display with the frame update. In this case, host remote desktop manager 114 may not want client remote desktop manager 112 to display multiple frame updates with the same missing image blocks, which may become noticeable to a user. However, if the missing image blocks correspond to a sequence of high frequency screen updates, host remote desktop manager 114 may ignore the missing image blocks as host remote desktop manager 114 will replace the missing image blocks in a subsequent frame update. Other remedial actions may also be taken, such as host remote desktop manager 114 may generate an alert for the packet loss event. Further, if the losses relate to the final frame sequence of high frequency updates (e.g. the final frame of a video), host remote desktop manager 114 may cause the retransmission of the missing image blocks, even if they were not requested. In this case, performance manager 114 may have assumed that the corrupted frame would be rapidly replaced by a subsequent frame update and displayed the corrupted image, but the ending of the video means an updated frame is not sent. Thus, host remote desktop manager 114 may resolve the corruption by sending the missing image blocks. Alternatively, performance manager 114 may itself request retransmission if the duration of the corruption is longer than initially predicted (i.e., a frame update is not received after a certain threshold for the region).

The image data needed for a frame update is typically compressed at remote desktop 108 and sent in a compressed stream to client device 104. Client remote desktop manager 112 then decompresses the compressed stream. In some cases, the decompression of a frame (or even a significant chunk of the frame) should not be dependent on all packets being present. That is, client remote desktop manager 112 should be able to decompress each image block (or small group of image blocks) in isolation. For example, if one packet including a set of image blocks is lost for a frame update, client remote desktop manager 112 should still be able to decompress other image blocks included in received packets for the frame update. If client remote desktop manager 112 cannot decompress the other image blocks, then displaying the frame update without the missing image blocks would not be possible. In one example, client remote desktop manager 112 can decompress image blocks in isolation when host remote desktop manager 114 uses lossy compression. However, host remote desktop manager 114 may use dictionary/windowed schemes for lossless compression that require all image blocks (and hence all packets) to be present from the stream to decompress the image blocks for a frame. Such lossless compression algorithms, such as DEFLATE, used in the popular portable network graphics (PNG) graphics image format, are well known such that the details thereof need not be presented here. Particular embodiments described herein address the different compression (lossy and lossless) schemes differently.

Figure 3:
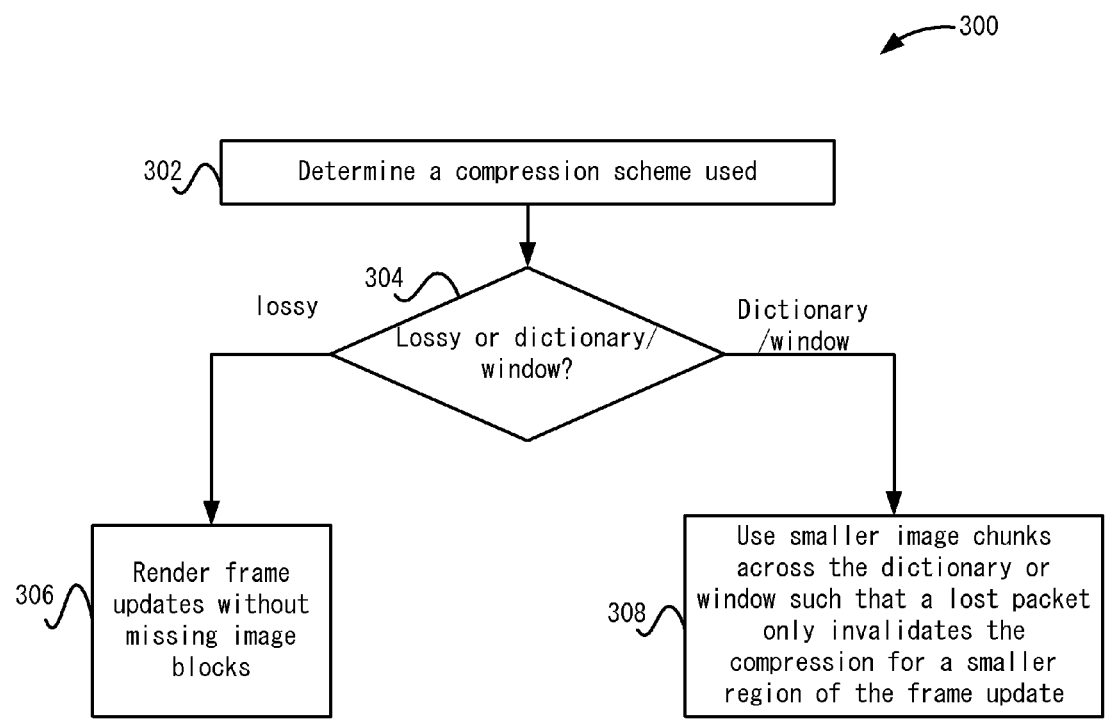
FIG. 3 depicts a simplified flowchart of a method for performing frame updates using different compression schemes according to one embodiment.

FIG. 3 depicts a simplified flowchart 300 of a method for performing frame updates using different compression schemes according to one embodiment. Particular embodiments may make the following adjustments to the remoting protocol when the lost packet tolerance scheme described above is used. At 302, host remote desktop manager 114 determines a compression scheme to use. For example, host remote desktop manager 114 may use different compression schemes at different times, such as the compression scheme may depend on the type of data being transmitted (e.g., video data).

At 304, host remote desktop manager 114 determines if a lossy compression scheme or a dictionary/windowed is being used. Although these two compression schemes are described, other compression schemes may be appreciated. In one embodiment, client remote desktop manager 112 may perform frame updates with missing image blocks only when a lossy compression scheme is being used. Thus, if lossy compression is not being used, the remoting protocol causes client remote desktop manager 112 to send requests for missing image blocks when packet loss occurs. Even though client remote desktop manager 112 may perform the frame updates without requiring missing image blocks to be received only when lossy compression is performed, this may not be overly restrictive as host remote desktop manager 114 may use lossy compression with activities that are conducive to displaying frame updates without missing image blocks. For example, high frequency frame update activities, such as video playback, may use lossy compression a majority of the time and are conducive to displaying frame updates with missing image blocks because the missing image blocks may be replaced in a subsequent frame update moments later. Accordingly, at 306, if host remote desktop manager 114 is using a lossy compression scheme, client remote desktop manager 112 renders frame updates without missing image blocks subject to the restrictions described above.

When a dictionary/windowed compression scheme is being used, all the image blocks in the dictionary or window cannot be decompressed if a missing image block occurs within the dictionary or window. This is because the decompression depends on information from all of the image blocks in the window. Thus, at 308, host remote desktop manager 114 may use smaller image chunks across the dictionary or window such that a lost packet only invalidates the compression for a smaller region of the frame update. In this case, the compression that can be achieved may be adversely impacted as lower compression ratios result because generally a smaller window means less compression can be obtained. However, the benefit is that particular embodiments improve user experience by allowing client remote desktop manager 112 to display frame updates without delay at the expense of increased bandwidth utilization. Also, the remoting protocol would already sub-divide a frame update into multiple regions most likely when host remote desktop manager 114 uses a dictionary/windowed compression scheme. Thus, these existing regions are just being broken into smaller sub-regions to minimize the size of the region disrupted by packet loss event.

Particular embodiments may switch compression schemes based on the type of image data host remote desktop manager 114 sends. For example, when video is being sent, host remote desktop manager 114 may use lossy compression and allow for the lost packet tolerance scheme to be performed by client remote desktop manager 112 as described in 306. Additionally, host remote desktop manager 114 may switch the compression scheme to another compression scheme that is more compatible with the lost packet tolerance scheme.

Figure 4:
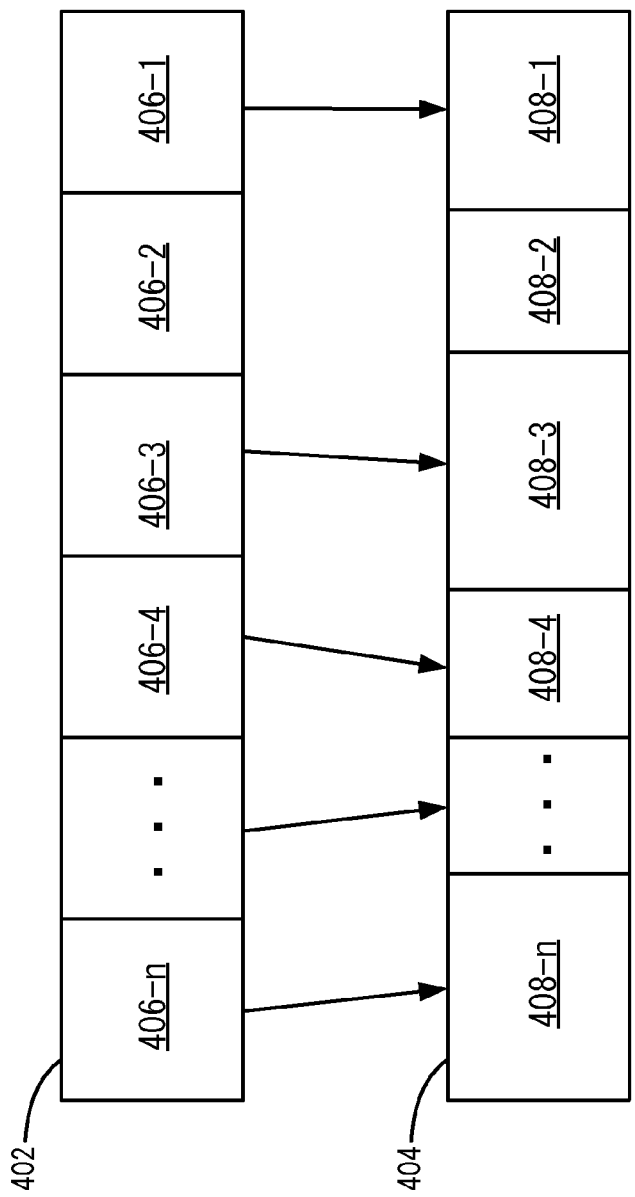
FIG. 4 shows the relationship between an uncompressed stream and a compressed stream according to one embodiment.

For client remote desktop manager 112 to decompress the compressed stream and correctly reconstruct a frame for the frame update, client remote desktop manager 112 needs to determine image block boundaries in a compressed stream that is only partly available due to packet loss. FIG. 4 shows the relationship between an uncompressed stream 402 and a compressed stream 404 according to one embodiment. In uncompressed stream 402, image blocks are a uniform size. For example, image blocks 406-1-406-*n* are of the same size. However, when compressed, compressed stream 404 includes compressed image blocks 408-1-408-*n* that vary in length depending on the compression achieved for each specific image block 406-1-406-*n*. For example, some image blocks 406 may be compressed to images blocks 408 of a smaller size if the compression achieved is greater. As seen, corresponding compressed image blocks 408-1, 408-2, . . . 408-*n* are different sizes and image boundaries do not correspond to image boundaries of uncompressed image blocks 406-1, 406-2, . . . 406-*n*.

Figure 5A:
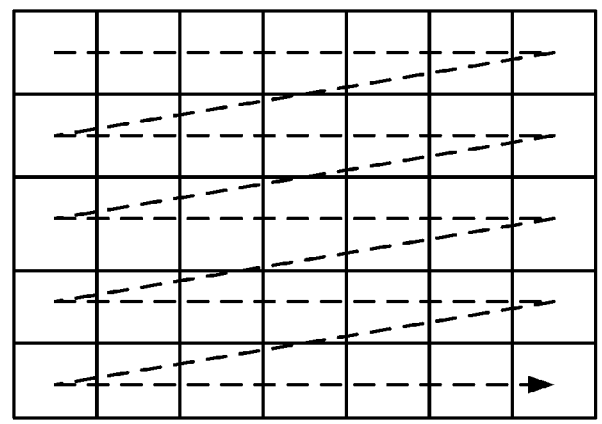
FIG. 5A shows the frame update sequence of image blocks.

Client remote desktop manager 112 needs to decompress compressed stream 404 and determine where to display are uncompressed image blocks in the frame. If no packet loss exists, once client remote desktop manager 112 has received the entire compressed representation of the frame, client remote desktop manager 112 can parse the compressed stream from start to finish. Each symbol/unit/chunk is processed in sequence as it is encountered. Because client remote desktop manager 112 parses the stream from start to finish, client remote desktop manager 112 can determine where to display the image blocks in the frame. For example, the compressed stream may start at a top left position of the frame and include data in a pattern shown in FIG. 5A. As client remote desktop manager 112 decompresses the compressed stream, client remote desktop manager 112 knows that each decompressed image block is displayed sequentially from the last decompressed image block in the frame update. However, when packet loss occurs, client remote desktop manager 112 cannot process the compressed stream sequentially from start to finish. Rather, missing image blocks exist in the decompressed stream. Due to the missing image blocks, client remote desktop manager 112 cannot determine where image blocks in the decompressed stream should be displayed in the frame because client remote desktop manager 112 cannot resynchronize the uncompressed stream 404 with a position in the frame after missing packets are encountered because of the irregular size of compressed image blocks 408.

Figure 5B:
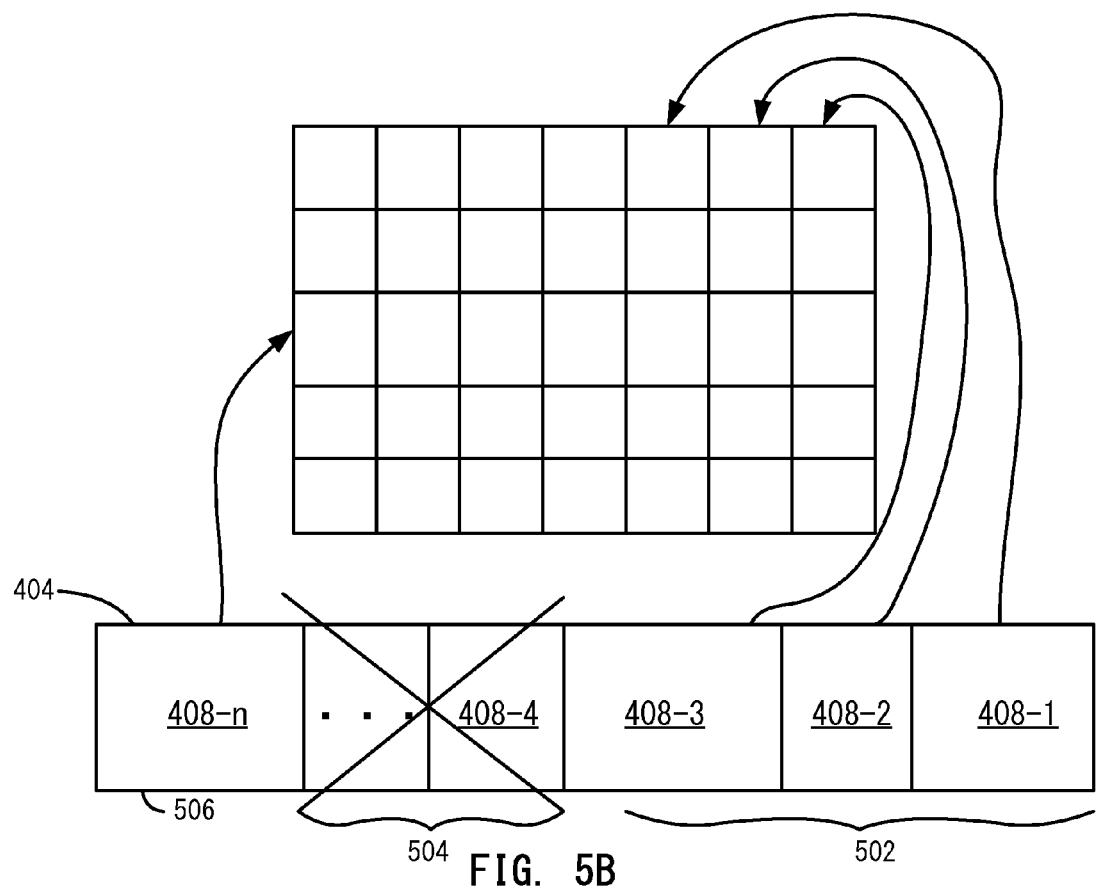
FIG. 5B shows the relationship between decompressed image blocks for the frame update to positions in the frame.

As shown in FIG. 5B, at 502, client remote desktop manager 112 has decompressed image blocks for the frame update from compressed stream 404. These decompressed image blocks may correspond to positions in a frame as shown. Then, client remote desktop manager 112 image encounters a lost packet such that missing image blocks result in compressed stream 404. The missing image blocks are shown conceptually at 504. At 506, client remote desktop manager 112 decompresses image blocks from packets received after the packet loss. However, client remote desktop manager 112 does not know where to place the decompressed image blocks in the frame. Because the variable size of image blocks in compressed stream 404, client remote desktop manager 112 cannot determine how many image blocks have been lost.

To allow client remote desktop manager 112 to resynchronize compressed stream 404 with a position in the frame, particular embodiments may provide markers that allow client remote desktop manager 112 to determine position information for image blocks that client remote desktop manager 112 decompresses. In one embodiment, host remote desktop manager 114 may mark compressed stream 404 at periodic intervals with markers, such as unique symbols, that allow client remote desktop manager 112 to re-synchronize compressed stream 404 following a packet loss that induces discontinuity in compressed stream 404. The frequency of the markers may dictate how quickly client remote desktop manager 112 can perform re-synchronization after a packet loss. For example, once a packet is lost, client remote desktop manager 112 cannot display any image blocks until a marker is encountered indicating a position of an image block in compressed stream 404. Thus, even though client remote desktop manager 112 has received some image blocks after the lost packet, client remote desktop manager 112 would not know where those image blocks are displayed in the frame until client remote desktop manager 112 receives another marker. The remoting protocol may balance between the desire to rapidly re-synchronize and limit the region invalidated in the frame with the overhead introduced by transmitting markers.

Figure 6A:
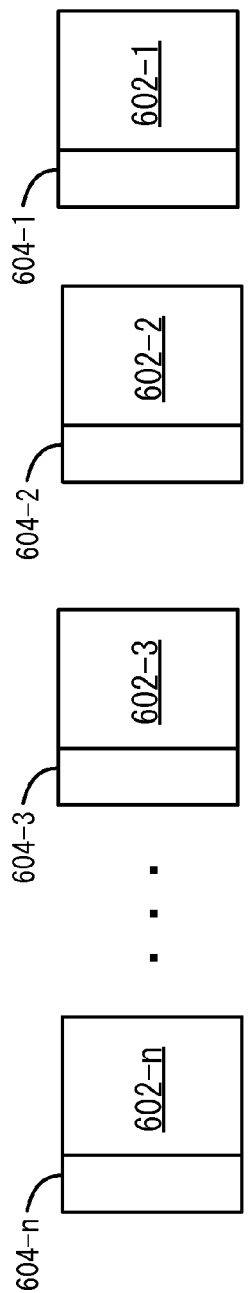
FIG. 6A shows markers that are included in packets according to one embodiment.

In one example, FIG. 6A shows markers 604-1-604-*n* that are included in packets 602-1-602-*n* according to one embodiment. In one embodiment, host remote desktop manager 114 may align image block boundaries with packets 602 such that image blocks do not span multiple packets 602. Then, in a header or the first few bytes of each packet 602, a marker 604 is inserted. Marker 604 may include positional information for the compressed blocks included in packet 602. For example, packets 602 include x,y coordinates to where to place the compressed image blocks in the frame. In one example, each packet 602 includes the x,y coordinate for the first image block in each packet. Client remote desktop manager 112 can then determine the positional information based on the x,y coordinate for the first image block for the rest of the image blocks in packet 602. That is, if the first image block starts at the first position of a row or slice of the frame, the rest of the image blocks in the packet fill out the row. In other embodiments, x,y coordinates may be included for more than the first image block, such as for every image block in packet 602.

As shown, a marker 604 may be included in each packet 602 that is sent. Thus, if, for example, a packet 602-2 is lost, when client remote desktop manager 112 receives packet 602-3, client remote desktop manager 112 uses marker 604-3 to re-synchronize compressed stream 404 with a position in the frame. For example, client remote desktop manager 112 knows where the uncompressed image blocks in packet 604-3 should be placed in the frame based on marker 604-3. In this case, client remote desktop manager 112 may determine the x,y position in the frame and then display image blocks sequentially from that position.

Inefficiencies may be introduced by alignment of image block boundaries with packet boundaries and the inclusion of markers 604. However, these inefficiencies may have a negligible impact on total bandwidth. However, the benefit of allowing client remote desktop manager 112 to rapidly re-synchronize due to packet loss may outweigh the inefficiency.

Figure 6B:
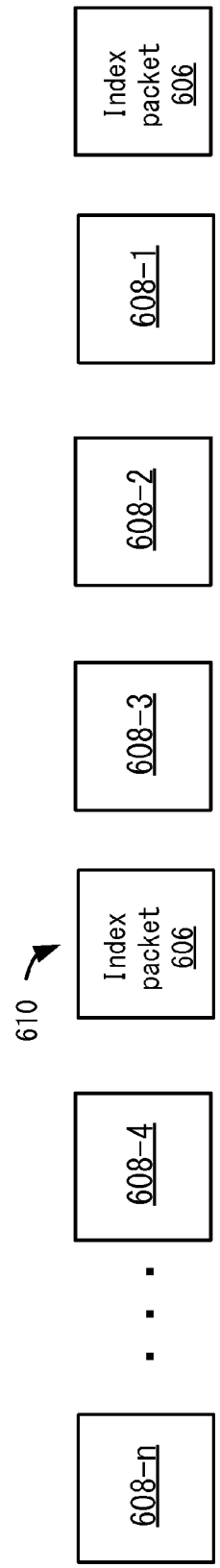
FIG. 6B depicts an example of resynchronizing compressed stream using an index according to one embodiment.

FIG. 6B depicts another example of resynchronizing compressed stream 404 using an index according to one embodiment. In one embodiment, at the start of each frame, host remote desktop manager 114 includes a marker that allows client remote desktop manager 112 to correctly align and reconstruct a partial uncompressed stream 404. For example, an index packet 606 is included in the stream of packets 608, and includes index information, which may indicate where image blocks in each packet 608-1-608-n for a frame update should be positioned. In one example, index packet 606 may indicate positional information for the first image block in each packet 608 that will be sent for a frame update. Thus, if packet 608-2 is lost, client remote desktop manager 112 may determine the positional information for packet 608-3 from index packet 606. For example, due to packets 608 including sequence numbers, when client remote desktop manager 112 receives packet 602-3, client remote desktop manager 112 knows that packet 602-3 is the third packet in the sequence. Client remote desktop manager 112 then determines the positional information for the third packet in index packet 606. Once determining the positional information, client remote desktop manager 112 then can display image blocks from packet 608-3 starting at an x,y position in the frame as indicated by the positional information.

Given the importance of index packet 606, host remote desktop manager 114 may send index packet 606 multiple times. For example, at 610, host remote desktop manager 114 has resent index packet 606. Also, other methods for ensuring that client remote desktop manager 112 receives index packets 606 may be used. For example, a reliable protocol, such as TCP, may be used to send index packet 606. An unreliable protocol, such as UDP, may still be used to send packets 608, however.

Figure 7:
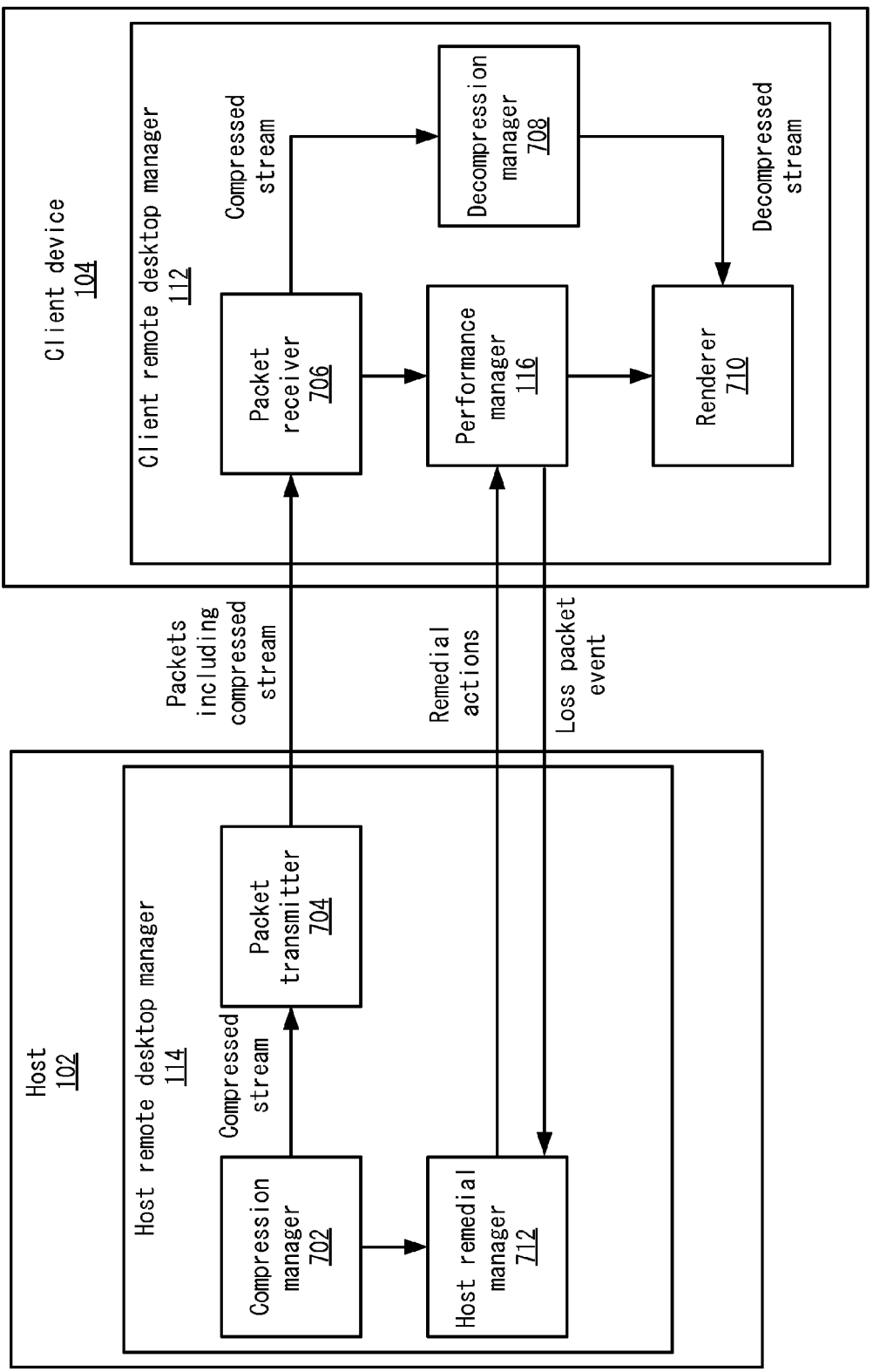
FIG. 7 depicts a more detailed example of a host remote desktop manager and a client remote desktop manager according to one embodiment.

FIG. 7 depicts a more detailed example of host remote desktop manager 114 and client remote desktop manager 112 according to one embodiment. At host 102, a compression manager 702 receives image blocks for a frame update and compresses the image blocks into a compressed stream. A packet transmitter 704 receives the compressed stream and includes portions of the compressed stream in a sequence of packets that is sent to client device 104.

A packet receiver 706 of client device 104 receives the packets. As discussed above, packets may be lost. Performance manager 116 analyzes the packets that are lost to determine if the frame update should be performed without the missing image blocks from the lost packets. Meanwhile, packet receiver 706 may extract the compressed stream in the packets and send the compressed stream to a decompression manager 708. Decompression manager 708 decompresses the compressed stream into a decompressed stream of image blocks.

A renderer 710 performs the frame update. As discussed above, renderer 710 may perform the frame update without the missing image blocks. In this case, performance manager 116 may send a signal to renderer 710 to indicate whether renderer 710 should render an updated frame without the missing image blocks. Also, renderer 710 may receive markers in addition to the decompressed stream from decompression manager 708. Renderer 710 uses the markers to determine where to display image blocks in the event of missing image blocks in the decompressed stream as discussed above. Renderer 710 then displays an updated frame when applicable.

When lost packets result, as discussed above, performance manager 116 sends a message to host remote desktop manager 114 indicating the loss of packets. A host remedial manager 712 analyzes the lost packets to determine if any remedial actions should be performed. For example, missing image blocks may be resent if the missing image blocks occur in the same area over a sequence of frame updates.

In one embodiment, host remote desktop manager 114 may reduce the packet size during periods of high packet loss to reduce the localized impact of a packet loss event. For example, a packet loss affects a smaller number of image blocks that would be missing for a frame update. Although this increases the number of packets that needs to be sent, which may increase the total number of packet losses, the losses may result in smaller sized and potentially less visually impacted missing parts of the frame update.

By making the compression stream more modular, additional parallelism can be introduced into the decompression process and also allow for the decompression process to commence before the entire frame or slice of the frame is received.

Accordingly, particular embodiments allow client device 104 to intelligently determine how to process a frame update in the event of a packet loss. By allowing client device 104 to update a frame with missing image blocks, improvements in user experience may result.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The non-transitory computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A computing device comprising:
   one or more processors; and
   storage medium storing a sequence of instructions that are executed by the one or more processors to:
      receive, over a network from a remote host server, a plurality of packets containing image information for a frame update of a graphical user interface (GUI) to be displayed by the computing device;
      detect that one or more packets in the plurality of packets were lost during transmission of the plurality of packets from the remote host server;
      determine whether the frame update corresponds to a sequence of frames of a fleeting duration; and
      in response to determining that the frame update corresponds to the sequence of frames of the fleeting duration, render the frame update that is missing at least a portion of the image information contained in the one or more packets that were lost during the transmission.

2. The computing device of claim 1, wherein rendering the frame update that is missing at least a portion of the image information contained in the one or more packets that were lost further comprises at least one of:
   extrapolating the missing image information from the received image information contained in the received plurality of packets;
   inserting image information into the frame update to reduce noticeability of the missing image information; or
   leaving image information from a previous frame unchanged during the frame update.

3. The computing device of claim 1, wherein detecting that the one or more packets were lost further comprises:
   waiting for a predetermined period of time to determine whether the one or more packets were delayed or lost; and
   determining that the one or more packets were lost after the predetermined period of time has passed.

4. The computing device of claim 1, wherein detecting that the one or more packets were lost further comprises:
   reading one or more sequence identifiers contained in the plurality of packets; and
   determining that the one or more packets were lost based on the sequence identifiers.

5. The computing device of claim 1, wherein render the frame update that is missing at least a portion of the image information further comprises:
   determining whether amount of the missing image information is below a threshold; and
   rendering the frame update without the missing image information if the amount of the missing information is below the threshold.

6. The computing device of claim 5, wherein determining whether the frame update corresponds to the sequence of frames of the fleeting duration further comprises:

pausing the rendering of the frame update and requesting the missing image information from the remote host server if the amount of the missing information is above the threshold.

7. The computing device of claim 1, wherein determining whether the frame update corresponds to the sequence of frames of the fleeting duration further comprises:
   determining that the frame update is part of a sequence of high frequency screen updates wherein a frame that is to be updated by the frame update is likely to be replaced by a subsequent frame update within a predetermined period of time.

8. A computer implemented method for performing a frame update of a graphical user interface (GUI), the method comprising:
   receiving, over a network from a remote host server, a plurality of packets containing image information for the frame update of the graphical user interface (GUI) to be displayed by a client device;
   detecting that one or more packets in the plurality of packets were lost during transmission of the plurality of packets from the remote host server;
   determining whether the frame update corresponds to a sequence of frames of a fleeting duration; and
   in response to determining that the frame update corresponds to the sequence of frames of the fleeting duration, rendering the frame update that is missing at least a portion of the image information contained in the one or more packets that were lost during the transmission.

9. The computer implemented method of claim 8, wherein rendering the frame update that is missing at least a portion of the image information contained in the one or more packets that were lost further comprises at least one of:
   extrapolating the missing image information from the received image information contained in the received plurality of packets;
   inserting image information into the frame update to reduce noticeability of the missing image information; or
   leaving image information from a previous frame unchanged during the frame update.

10. The computer implemented method of claim 8, wherein detecting that the one or more packets were lost further comprises:
    waiting for a predetermined period of time to determine whether the one or more packets were delayed or lost; and
    determining that the one or more packets were lost after the predetermined period of time has passed.

11. The computer implemented method of claim 8, wherein detecting that the one or more packets were lost further comprises:
    reading one or more sequence identifiers contained in the plurality of packets; and
    determining that the one or more packets were lost based on the sequence identifiers.

12. The computer implemented method of claim 8, wherein render the frame update that is missing at least a portion of the image information further comprises:
    determining whether amount of the missing image information is below a threshold; and
    rendering the frame update without the missing image information if the amount of the missing information is below the threshold.

13. The computer implemented method of claim 12, wherein determining whether the frame update corresponds to the sequence of frames of the fleeting duration further comprises:
    pausing the rendering of the frame update and requesting the missing image information from the remote host server if the amount of the missing information is above the threshold.

14. The computer implemented method of claim 8, wherein determining whether the frame update corresponds to the sequence of frames of the fleeting duration further comprises:
    determining that the frame update is part of a sequence of high frequency screen updates wherein a frame that is to be updated by the frame update is likely to be replaced by a subsequent frame update within a predetermined period of time.

15. A non-transitory computer readable storage medium storing a set of instructions executed by one or more processors to cause the one or more processors to perform a set of operations, comprising:
    receiving, over a network from a remote host server, a plurality of packets containing image information for the frame update of the graphical user interface (GUI) to be displayed by a client device;
    detecting that one or more packets in the plurality of packets were lost during transmission of the plurality of packets from the remote host server;
    determining whether the frame update corresponds to a sequence of frames of a fleeting duration; and
    in response to determining that the frame update corresponds to the sequence of frames of the fleeting duration, rendering the frame update that is missing at least a portion of the image information contained in the one or more packets that were lost during the transmission.

16. The non-transitory computer readable storage medium of claim 15, wherein rendering the frame update that is missing at least a portion of the image information contained in the one or more packets that were lost further comprises at least one of:
    extrapolating the missing image information from the received image information contained in the received plurality of packets;
    inserting image information into the frame update to reduce noticeability of the missing image information; or
    leaving image information from a previous frame unchanged during the frame update.

17. The non-transitory computer readable storage medium of claim 15, wherein detecting that the one or more packets were lost further comprises:
    waiting for a predetermined period of time to determine whether the one or more packets were delayed or lost; and
    determining that the one or more packets were lost after the predetermined period of time has passed.

18. The non-transitory computer readable storage medium of claim 15, wherein detecting that the one or more packets were lost further comprises:
    reading one or more sequence identifiers contained in the plurality of packets; and
    determining that the one or more packets were lost based on the sequence identifiers.

19. The non-transitory computer readable storage medium of claim 15, wherein render the frame update that is missing at least a portion of the image information further comprises:

determining whether amount of the missing image information is below a threshold; and rendering the frame update without the missing image information if the amount of the missing information is below the threshold.

20. The non-transitory computer readable storage medium of claim 15, wherein determining whether the frame update corresponds to the sequence of frames of the fleeting duration further comprises:

determining that the frame update is part of a sequence of high frequency screen updates wherein a frame that is to be updated by the frame update is likely to be replaced by a subsequent frame update within a predetermined period of time.

* * * * *